United States Patent
Hymel (10) Patent No.: US 7,024,183 B2
(45) Date of Patent: Apr. 4, 2006

(54) COMMUNICATION DEVICE WITH INTELLIGENT COMMUNICATION MANAGEMENT AND METHOD THEREFOR

(75) Inventor: James A. Hymel, Lake Worth, FL (US)

(73) Assignee: Motorola, Inc., Schaumburg, IL (US)

(*) Notice: Subject to any disclaimer, the term of this patent is extended or adjusted under 35 U.S.C. 154(b) by 115 days.

(21) Appl. No.: 10/630,487

(22) Filed: Jul. 30, 2003

(65) Prior Publication Data

US 2005/0026600 A1 Feb. 3, 2005

(51) Int. Cl.
*H04Q 7/00* (2006.01)

(52) U.S. Cl. ...................................... 455/417

(58) Field of Classification Search ............... 455/417, 455/418, 428, 445, 408, 343.3–343.4, 412.1–412.2, 455/414.1; 370/395.1, 395.4
See application file for complete search history.

(56) References Cited

U.S. PATENT DOCUMENTS

| | | | |
|---|---|---|---|
| 5,918,164 A | * | 6/1999 | Takahashi et al. .......... 455/134 |
| 6,112,088 A | * | 8/2000 | Haartsen ..................... 455/437 |
| 6,131,038 A | * | 10/2000 | Sekine ........................ 455/513 |
| 2002/0059176 A1 | * | 5/2002 | Fujisawa ....................... 707/1 |

* cited by examiner

*Primary Examiner*—Congvan Tran
(74) *Attorney, Agent, or Firm*—Randi L. Karpinia; Daniel C. Crilly (57) ABSTRACT

A communication device (100) having intelligent communication management includes a transceiver (110), a memory (120), and a communications manager application (140). The communication device (100) initiates communication connections sequentially with a plurality of communication means associated with a contact in response to a user input or alternatively based on a preset communication preference. The contact and associated communication means are stored in memory (120). When a communication connection is disconnected or not able to be established, the communications manager application (140) identifies the next communications means to initiate a communication connection with the contact.

9 Claims, 7 Drawing Sheets

FIG. 1

| CONTACT A — 205 | | CONTACT B — 210 | |
|---|---|---|---|
| 225 | | 230 | |
| NAME | John Doe | NAME | Jane Doe |
| EMAIL | jd@email.com | EMAIL | jd@email1.com |
| MESSENGER | (123) 663-3383 | MESSENGER | (123) 663-8888 |
| CELL | (123) 443-3003 | CELL | (123) 443-3012 |
| WORK | (123) 837-4859 | WORK | (123) 837-4867 |
| HOME | (123) 948-47630 | HOME | (123) 948-4762 |
| FAX | (123) 489-2284 | FAX | (123) 489-2222 |

| CONTACT C — 215 | | CONTACT N — 220 | |
|---|---|---|---|
| 235 | | 240 | |
| NAME | Jason Doe | NAME | Jeff Doe |
| EMAIL | jd@email2.com | EMAIL | jd@email3.com |
| MESSENGER | (123) 663-3311 | MESSENGER | (123) 663-3355 |
| CELL | (123) 443-3022 | CELL | (123) 443-3000 |
| WORK | (123) 837-4859 | WORK | (123) 837-4855 |
| HOME | (123) 948-4762 | HOME | (123) 948-4745 |
| FAX | (123) 489-2234 | FAX | (123) 489-2284 |

CONTACTS PREFERENCES

| CONTACT | COMMUNICATION PREFERENCE | SCHEDULE | COMMUNICATIONS MEANS #1 | COMMUNICATIONS MEANS #2 | COMMUNICATIONS MEANS #3 | ... | COMMUNICATIONS MEANS #N |
|---------|--------------------------|----------|-------------------------|-------------------------|-------------------------|-----|-------------------------|
| CONTACT A | PATTERN | ALL | CELLULAR TELEPHONE | HOME TELEPHONE | MESSENGER | ... | |
| CONTACT B | FIXED | ALL | OFFICE TELEPHONE | HOME TELEPHONE | CELLULAR TELEPHONE | | |
| ... | | | | | | | |
| CONTACT N | FIXED TIME BASED | WEEKDAY 8AM-6PM | WORK TEL | MESSENGER | EMAIL | | |
| | | WEEKDAY 6PM-8AM | HOME TEL | CELL TEL | MESSENGER | ... | |
| | | WEEKENDS | HOME TEL | CELL TEL | MESSENGER | | |

COMMUNICATION DEVICE WITH INTELLIGENT COMMUNICATION MANAGEMENT AND METHOD THEREFOR

BACKGROUND OF THE INVENTION

1. Field of the Invention

The present invention is related to communication devices, and more particularly to management of communications with one or more contacts using a communication device.

2. Description of the Related Art

Today, most people utilize multiple communication devices. A person, for example, may have a home telephone number, office telephone number, cellular telephone, two-way messaging device, and one or more email (electronic mail) addresses. To contact this person, one must sequentially try each of the numbers taking into account the most probable location that the person is at that moment. This creates an extremely fragmented communication experience. For example, the caller tries the person's office telephone and gets voicemail. Then the caller tries the mobile phone and again gets voicemail. Then the caller sends a short message via instant messaging or email. Dialing all these various numbers sequentially can be distracting and tedious to the caller.

Cellular telephones, PDAs (Personal Digital Assistants) and other portable electronic devices having communication capability have become fixtures of everyday life over the last several years. As they evolve, prices continue to fall while the devices' capabilities have expanded. Currently, such devices can be used in many places to initiate telephone calls, make wireless connection to the Internet, play games, as well as carry out electronic mail (email) and other messaging functions. It can readily be anticipated that as time goes by, the capabilities of such devices will continue to expand as prices continue to fall, making use of such devices a permanent part of people's daily lives.

One popular feature of today's communication devices is the use of a contact directory or address book. The contact directory feature enables a device user to create, organize, and manage a list of friends, family members, and co-workers on their computer, personal digital assistant, or wireless device. Users can create and store multiple communication links for one or more different contacts to facilitate electronic communication. For example, a device user can store the communication link for his/her co-worker's cellular telephone, office telephone, home telephone, wireless messaging device, and electronic mail address. To communicate with the co-worker, the device user can choose one of the stored communication links and initiate a communication to the co-worker.

One drawback of today's devices is the manual nature of choosing with which communication device to initiate a communication. For example, it can be tedious to locate a contact by randomly calling the contact's office telephone, then his mobile phone, and then send a message to his messaging device as described previously. In a mobile environment, especially while driving, it can be time consuming, and cumbersome, to continue to access the contact directory each time a new call has to be started because the intended person is not answering the previously called numbers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages all in accordance with the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly and not necessarily mechanically. The terms "program," "software application," and the like, as used herein, are defined as a sequence of instructions designed for execution on a computer system. A program, computer program, or software application may include a subroutine, a function, a procedure, an object method, an object implementation, an executable application, an applet, a servlet, source code, object code, a shared library/dynamic load library and/or other sequence of instructions designed for execution on a computer system.

Figure 1:
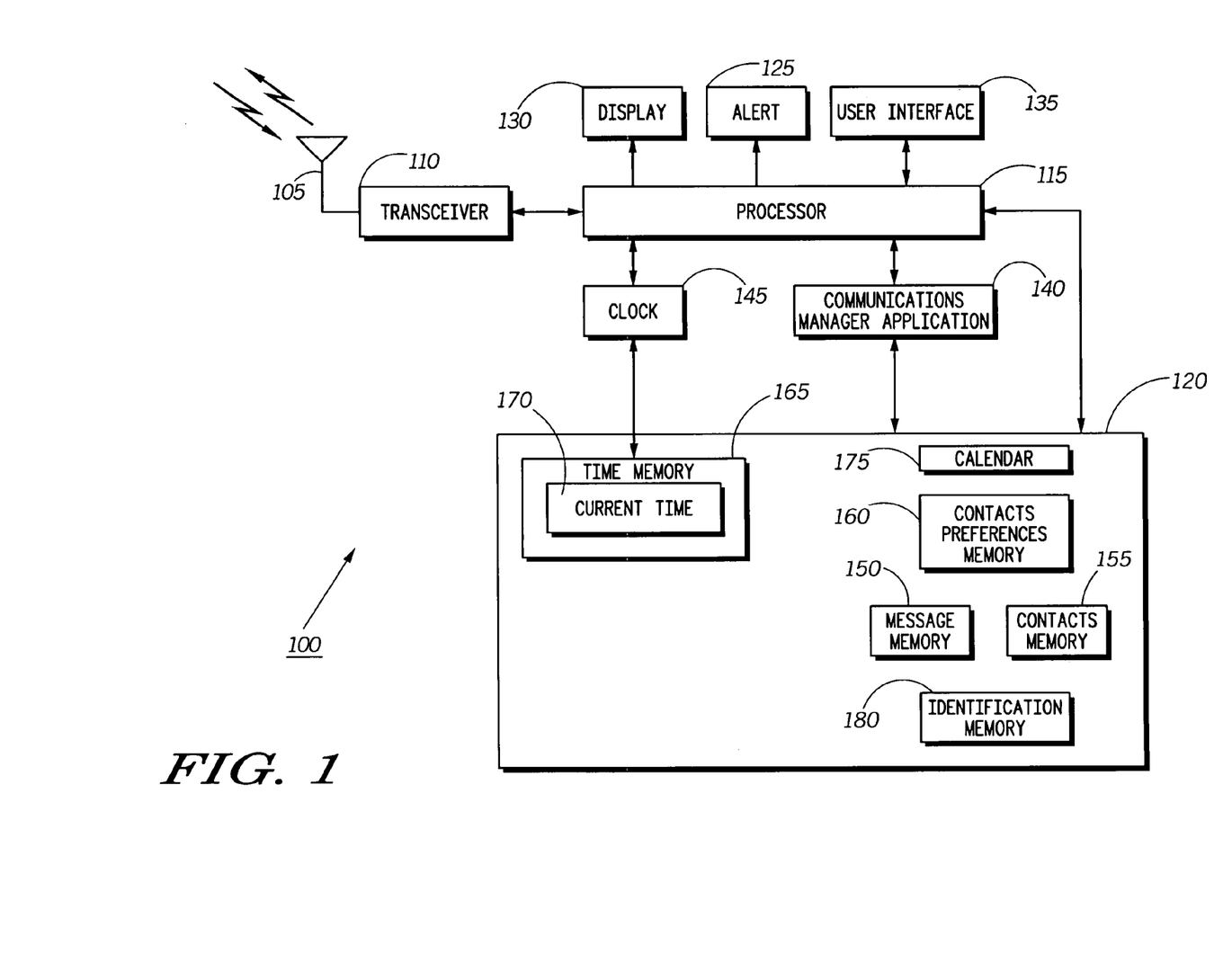
FIG. 1 illustrates one embodiment of a communication device.

FIG. 1 is an electronic block diagram of a communication device 100. It will be appreciated by one of ordinary skill in the art that the communication device in accordance with the present invention can be a personal computer, a personal digital assistant, or the like having communications capability. Further, it will be appreciated by one of ordinary skill in the art that the communication device, in accordance with the present invention, can be a mobile cellular telephone, a mobile radio data terminal, a mobile cellular telephone having an attached data terminal, or a two way messaging device. Further, the communication device 100 can be a small portable personal computer having wireless communications capability. In the following description, the term "communication device" refers to any of the devices mentioned above or an equivalent.

As illustrated, the communication device 100 preferably includes an antenna 105, a transceiver 110, a processor 115, a memory 120, an alert circuit 125, a display 130, a user interface 135, a communications manager application 140, and a clock 145.

The antenna 105 intercepts transmitted signals from one or more communication systems and transmits signals to the one or more communication systems. It will be appreciated by those of ordinary skill in the art that one or more of the communication systems, in accordance with the present invention, can function utilizing any wireless radio frequency (RF) channel, for example, a two-way messaging channel, a mobile cellular telephone channel, or a mobile radio channel. Similarly, it will be appreciated by one of ordinary skill in the art that one or more of the communication systems can function utilizing other types of wireless communication channels such as infrared channels and/or Bluetooth channels. Similarly, it will be appreciated by one of ordinary skill in the art that one or more of the communication systems can function utilizing a wire line communication channel such as a local area network (LAN) or a wide area network (WAN) or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures. The WAN, for example, can use a physical network media such as X.25, Frame Relay, ISDN, Modem dial-up or other media. In the following description, the term "communication system" refers to any of the communication systems mentioned above or an equivalent. Further, in the following description, the term "communication device" refers to any device operating within the communication systems mentioned herein or an equivalent.

The antenna 105 is coupled to the transceiver 110, which employs conventional demodulation techniques for receiving the communication signals. The transceiver 110 is coupled to the processor 115 and is responsive to commands from the processor 115. When the transceiver 110 receives a command from the processor 115, the transceiver 110 sends a signal via the antenna 105 to one or more of the communication systems. In an alternative embodiment (not shown), the communication device 100 includes a receive antenna and a receiver for receiving signals from one or more of the communication systems and a transmit antenna and a transmitter for transmitting signals to one or more of the communication systems. It will be appreciated by one of ordinary skill in the art that other similar electronic block diagrams of the same or alternate type can be utilized for the communication device 100.

Coupled to the transceiver 110 is the processor 115 utilizing conventional signal-processing techniques for processing received messages. It will be appreciated by one of ordinary skill in the art that additional processors can be utilized as required to handle the processing requirements of the processor 115. The processor 115 decodes an identification in the demodulated data of a received message, compares the decoded identification with one or more identifications stored in an identification memory 180 of the memory 120, and when a match is detected, proceeds to process the remaining portion of the received message. The one or more identifications, for example, can be a unique selective call address assigned within a wireless communication system, an electronic mail address, an IP (internet protocol) address or any other similar identification.

To perform the necessary functions of the communication device 100, the processor 115 is coupled to the memory 120, which preferably includes a random access memory (RAM), a read-only memory (ROM), and an electrically erasable programmable read-only memory (EEPROM) (not shown). It will be appreciated by those of ordinary skill in the art that the memory 120 can be integrated within the communication device 100, or alternatively, can be at least partially contained within an external memory such as a memory storage device (not shown). The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the communication device 100. The SIM card can be used to transfer a variety of information from/to the communication device 100 and/or any other compatible device. Preferably, the memory 120 includes a time memory 165 for storing a current time 170, a contacts preferences memory 160, a message memory 150, a contacts memory 155, a calendar memory 175, and the identification memory 180.

Upon receipt and processing of a message or a call, the processor 115 preferably generates a command signal to the alert circuit 125 as a notification that the message has been received and stored or alternatively that a call is waiting for a response. The alert circuit 125 similarly can be utilized for other alerting notifications such as an alarm clock, a calendar event alert, an alert notification that a communication call has been disconnected or has failed, an alert indication that a communication number is stored within the contacts memory 155, an alert notification that the message memory 150 is at its memory storage limitations, or the like. The alert circuit 125 can include a speaker (not shown) with associated speaker drive circuitry capable of playing melodies and other audible alerts, a vibrator (not shown) with associated vibrator drive circuitry capable of producing a physical vibration, or one or more light emitting diodes (LEDs) (not shown) with associated LED drive circuitry capable of producing a visual alert. It will be appreciated by one of ordinary skill in the art that other similar alerting means as well as any combination of the audible, vibratory, and visual alert outputs herein described can be used for the alert circuit 125.

Figure 2:
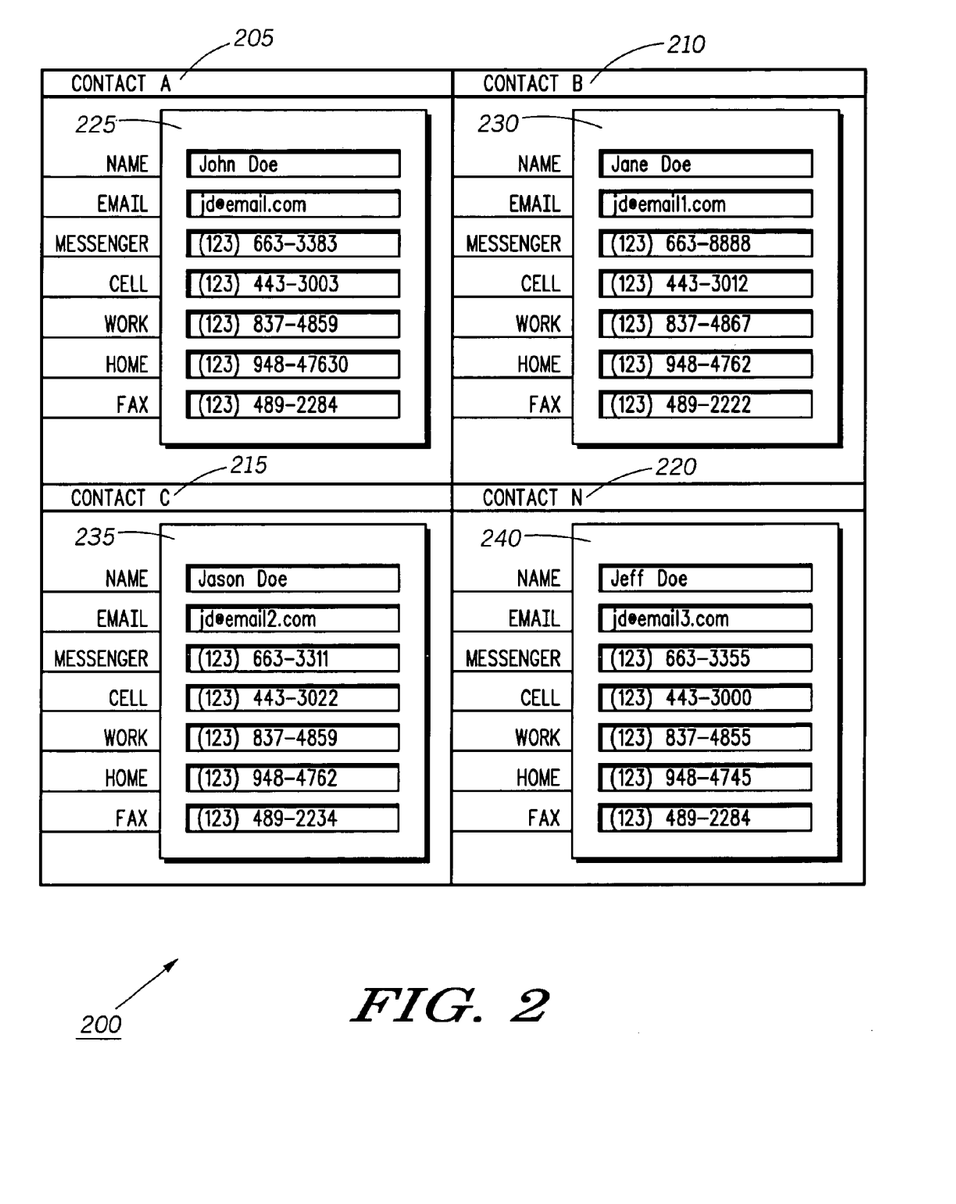
FIG. 2 illustrates an exemplary embodiment of a contact directory stored within the communication device of FIG. 1.

Upon receipt and processing of a message or a received call, the processor 115 preferably also generates a command signal to the display 130 to generate a visual notification. Similarly, the display 130 can be utilized as a means for providing information to the device user. For example, as illustrated in FIG. 2, the device user's current contact directory 200 as stored within the contacts memory 155 can be displayed on the display 130. Similarly, calendar and event information stored within the calendar memory 175 can be displayed on the display 130. The display can be a liquid crystal display, a cathode ray tube display, one or more organic light emitting diodes (LEDs), one or more LEDs, a plasma display, or an equivalent.

Preferably, the user interface 135 is coupled to the processor 115. The user interface 135 can include a keypad, such as one or more buttons used to generate a button press or a series of button presses. The user interface 135 can also include a voice response system or other similar method of receiving a manual input initiated by the device user. The processor 115, in response to receiving a user input via the user interface 135, performs commands as required. For example, the user interface 135 can be utilized for performing functions related to the messages stored in the message memory 150, such as reading, replying, or deleting one or more stored messages. The user interface 135 can further be used to perform functions on one or more contacts stored in the contact memory 155, such as accessing, adding, deleting, or changing information related to one or more contacts. The user interface 135, in conjunction with the display 130 and/or the alert 125, can further be used to access the contact memory 155 for finding one or more contact numbers to initiate a communication with. The user interface 135 further can be used to change one or more user preferences stored in the contacts preferences memory 160. The user interface 135 further can be used to perform functions on one or more calendar events stored within the calendar memory 175, such as accessing, adding, deleting, or changing information or preferences related to one or more calendar events.

As illustrated, the clock 145 preferably is coupled between the processor 115 and the time memory 165 of the memory 120. The clock 145 provides timing for the processor 115. The clock 145 preferably also provides the current time 170 which is stored in the time memory 165 for use in the operation of the communication device 100 as described herein.

In a preferred embodiment, the communication device 100 includes the communications manager application 140 coupled between the processor 115 and the memory 120. The communications manager application 140 can be hard coded or programmed into the communication device 100 during manufacturing, can be programmed over-the-air upon customer subscription, or can be a downloadable application. It will be appreciated that other programming methods can be utilized for programming the communications manager application 140 into the communication device 100. It will be further appreciated by one of ordinary skill in the art that the communications manager application 140 can be hardware circuitry within the communication device 100.

The communications manager application 140 preferably provides intelligent communication management for the communication device 100. For example, when a dialed call goes unanswered or the caller disconnects before an answer is made the communications manager application 140 can be programmed to examine the dialed number, reference that back to a contact directory entry, and then offer all other stored communications entries that match that particular contact. Alternatively, the communications manager application 140 can store regularly dialed 'patterns' for a particular contact. For example, a stored pattern for a contact could be: office telephone number, mobile telephone number, email address. If the communications manager application 140 detects the use of any of the 2 numbers or emailing on the email address, it can 'offer' the user the ability to communicate with the contact using the other two numbers/email addresses.

FIG. 2 illustrates an exemplary embodiment of a contact directory 200 stored within the contacts memory 155 of the communication device 100 of FIG. 1. As illustrated, the contact directory 200 includes one or more contacts (205, 210, 215, 220) along with one or more communication means (225, 230, 235, 240) for each of the one or more contacts (205, 210, 215, 220) respectively. The one or more communication means (225, 230, 235, 240) can include, for example, one or more email addresses, one or more telephone numbers, one or more facsimile numbers, one or more messaging addresses and the like.

Figure 3:
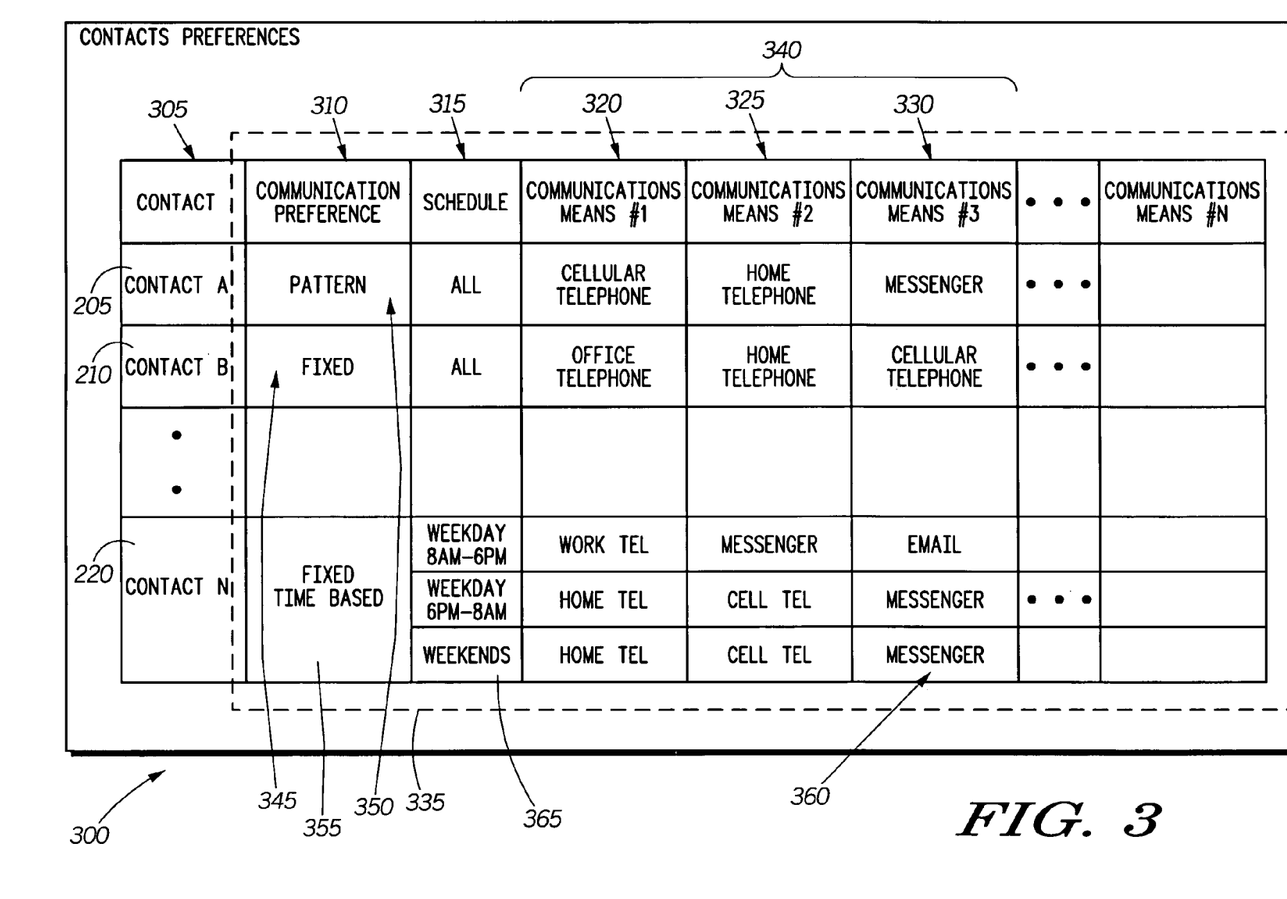
FIG. 3 illustrates an exemplary embodiment of a contact preferences directory stored within the communication device of FIG. 1.

FIG. 3 illustrates an exemplary embodiment of a contact preferences directory 300 stored within the contacts preferences memory 160 of the communication device 100 of FIG. 1. The contact preferences directory 300 preferably stores one or more contacts 305 along with one or more communication preference information 335 associated with each of the one or more contacts. The communication preference information 335 preferably includes a communication preference 310, a schedule 315, and a communication means order 340, such as a first communication means 320, a second communication means 325, a third communication means 330, and the like. It will be appreciated by those of ordinary skill in the art that although three communication means are illustrated, any number of communication means can be included. Further, it will be appreciated by those of ordinary skill in the art that additional communication means can be added and current communication means can be deleted by the device user either manually via the user interface 135 or via a received signal.

The communication preference 310, for example, can be a fixed communication order 345, a pattern communication order 350, a fixed time based communication order 355, and the like. The schedule 315 indicates when the communication preference 310 will be utilized by the communication device 100. For example, the schedule 315 can identify using the communication preference 310 for a fixed communication order 345 or a pattern communication order 350. Alternatively, the schedule 315 can identify one or more time periods 365 for an associated time based communication order for each of the time periods. Those skilled in the art will recognize that the information stored within the contact preferences directory 300 can be entered manually by the device of the communication device 100 user via the user interface 135, can be programmed into the communication device 100 either via signals received by the antenna 105 or direct contact programming methods, or any other equivalent method.

To exemplify the manner in which information is stored within the contact preferences directory 300, FIG. 3 illustrates the communication preference information 335 for contact A (205), contact B (210) through contact N (225). As illustrated, the user of the communication device 100 has entered the pattern communication order 350 for the communication preference 310 for contact A (205) for the schedule 315 of all periods of time. The pattern communication order 350 at the current time illustrated provides for the first communication means 320 to be contact A's cellular telephone, the second communication means 325 to be contact A's home telephone, and the third communication means 330 to be contact A's messenger. Therefore, the communication connection sequence for contact A (205), as described hereafter in FIGS. 4 through 9, would be this order.

As illustrated in FIG. 3, for contact B (210), the user of the communication device 100 has entered the fixed communication order 345 for the communication preference 310 for the schedule 315 of all periods of time. The fixed communication order 345 illustrated provides for the first communication means 320 to be contact B's office telephone, the second communication means 325 to be contact B's home telephone, and the third communication means 330 to be contact B's cellular telephone. Therefore, the communication connection sequence, as described hereafter in FIGS. 4 through 9, for contact B (210) would be this order.

As illustrated in FIG. 3, for contact N (220), the user of the communication device 100 has entered the fixed time based communication order 355 for the communication preference 310 for the schedule 315 including three time periods (weekdays 8 AM to 6 PM, weekdays 6 PM to 8 AM, and weekends). The fixed time based communication order 355 during weekdays 8 AM to 6 PM illustrated provides for the first communication means 320 to be contact N's work telephone, the second communication means 325 to be contact N's messenger, and the third communication means 330 to be contact N's email. Therefore, the communication connection sequence, as described hereafter in FIGS. 4 though 9, for contact N (210) would be this order during weekdays 8 AM to 6 PM. The fixed time based communication order 355 during weekdays 6 PM to 8 AM illustrated provides for the first communication means 320 to be contact N's home telephone, the second communication means 325 to be contact N's cellular telephone. and the third communication means 330 to be contact N's messenger. Therefore, the communication connection sequence, as described hereafter in FIGS. 4 through 9, for contact N (210) would be this order during weekdays 6 PM to 8 AM. The fixed time based communication order 355 during weekends illustrated provides for the first communication means 320 to be contact N's home telephone, the second communication means 325 to be contact N's cellular telephone, and the third communication means 330 to be contact N's messenger. Therefore, the communication connection sequence, as described hereafter in FIGS. 4 through 9, for contact N (210) would be this order during weekends.

Figure 4:
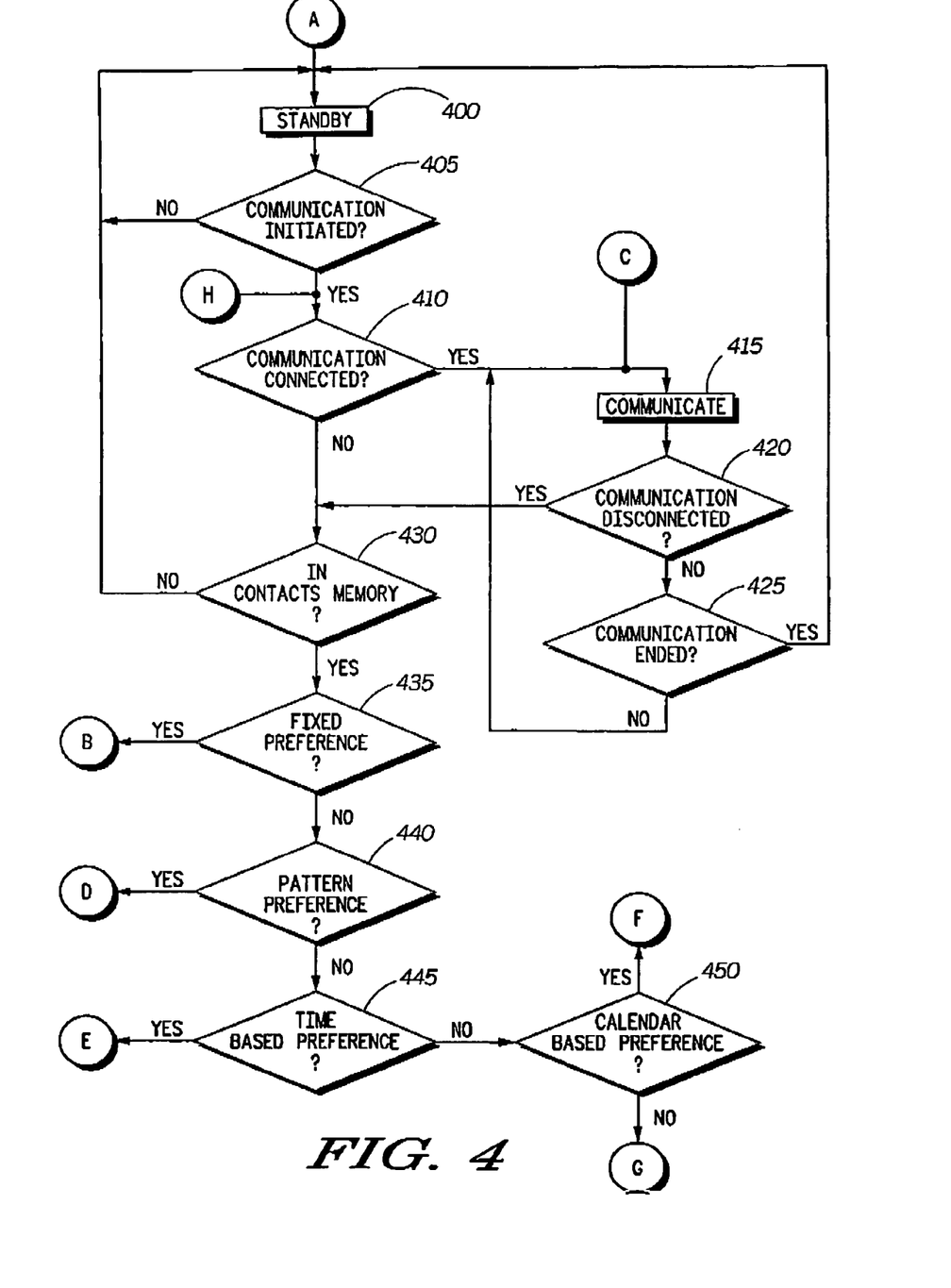
FIGS. 4 through 9 illustrate various embodiments of the operation of the communication device of FIG. 1.

FIGS. 4 through 9 illustrate various embodiments of the operation of the communication device 100 of FIG. 1. FIG. 4 is a flowchart illustrating the overall intelligent communication management operation of the communication device 100 in accordance with the present invention. As illustrated, the process begins with node A. The process then continues with Step 400 in which the communication device 100 is in standby mode. Standby mode runs the communication device 100 with minimal power to conserve battery life. Next, in Step 405, the process determines whether or not a communication has been initiated. For example, the communication management application 140 can receive a signal from the processor 115 indicating that a communication connection has been initiated by the device user. When a call has not been initiated in Step 405, the process cycles back to the standby mode of Step 400. When a communication has been initiated in Step 405, the process continues with an identification from node H and then continues to Step 410 in which the process determines whether the communication has been connected. For example, the communications management application 140 receives a signal from the processor 115 indicating a communication connection has been established. When a communication connection has been established in Step 410 the process continues with node C being identified and then continues to Step 415 in which the communication continues with the connection recipient or device. The connection recipient, for example, can be one or more contacts. Next, in Step 420, the process determines whether the communication has been disconnected. In Step 425, when the communication has not been disconnected in Step 420, the process determines whether the communication has ended. For example, the originator or recipient of the communication can end the connection by hanging up. When the communication has been ended in Step 425, the process cycles back to the standby mode of Step 400. When the communication has not ended in Step 425, the process cycles back to Step 415 and the communication continues. In Step 430, when the initiated communication does not result in a connection in Step 410 or when the communication is disconnected in Step 420, the process determines whether the communication means associated with the initiated communication is stored within the contacts memory 155. For example, in response to a signal from the processor 115 indicating the disconnection or lack of answering of the initiated communication, the communications manager application 140 can compare the communication means to the contacts directory 200, identifying whether or not a match exists. When the communication means is not stored within the contacts directory 200, the process cycles back to the standby mode of Step 400. In Step 435, when the communication means is stored within the contacts memory 155, the process determines whether a fixed communication connection preference has been associated with the contact having the matching communication means. For example, the communications manager application 140 can identify the matching contact within the contacts directory 200 and then cross reference to the contact preferences directory 300 to determine whether the communication preference 310 for the identified contact is a fixed communication order 345. When the communication preference 310 is the fixed communication order 345 in Step 435, the process continues to node B. When the communication preference 310 is not the fixed communication order 345 in Step 435, the process continues to Step 440 in which the process determines whether a pattern communication connection preference has been associated with the contact having the matching communication means. For example, the communications manager application 140 can identify the matching contact within the contacts directory 200 and then cross reference to the contact preferences directory 300 to determine whether the communication preference 310 for the identified contact is a pattern communication order 350. When the communication preference 310 is the pattern communication order 350 in Step 440, the process continues to node D. When the communication preference 310 is not the pattern communication order 350 in Step 440, the process continues to Step 445 in which the process determines whether a time based communication connection preference has been associated with the contact having the matching communication means. For example, the communications manager application 140 can identify the matching contact within the contacts directory 200 and then cross reference to the contact preferences directory 300 to determine whether the communication preference 310 for the identified contact is a fixed time based communication order 355. When the communication preference 310 is the fixed time based communication order 355 in Step 445, the process continues to node E. When the communication preference 310 is not the fixed time based communication order 355 in Step 445, the process continues to Step 450 in which the process determines whether a calendar based preference has been associated with the contact having the matching communication means. For example, the communications manager application 140 can identify the matching contact within the contacts directory 200 and ten cross reference to the contact preferences directory 300 to determine whether the communication preference 310 for the identified contact is a calendar based communication order. When the communication preference 310 is the calendar based communication order in Step 450, the process continues to node F. When the communication preference 310 is not the calendar based communication order in Step 450, the process continues to node G. The process described herein for FIG. 4 illustrates an exemplary embodiment of the overall operation of the communication device 100 in accordance with the present invention. Each of the specific operations according to the nodes identified previously herein will be described in further detail in FIGS. 5 through 9. It will be appreciated by those of ordinary skill in the art that other, equivalent operations, providing the same or similar results, can be utilized in accordance with the present invention.

Figure 5:
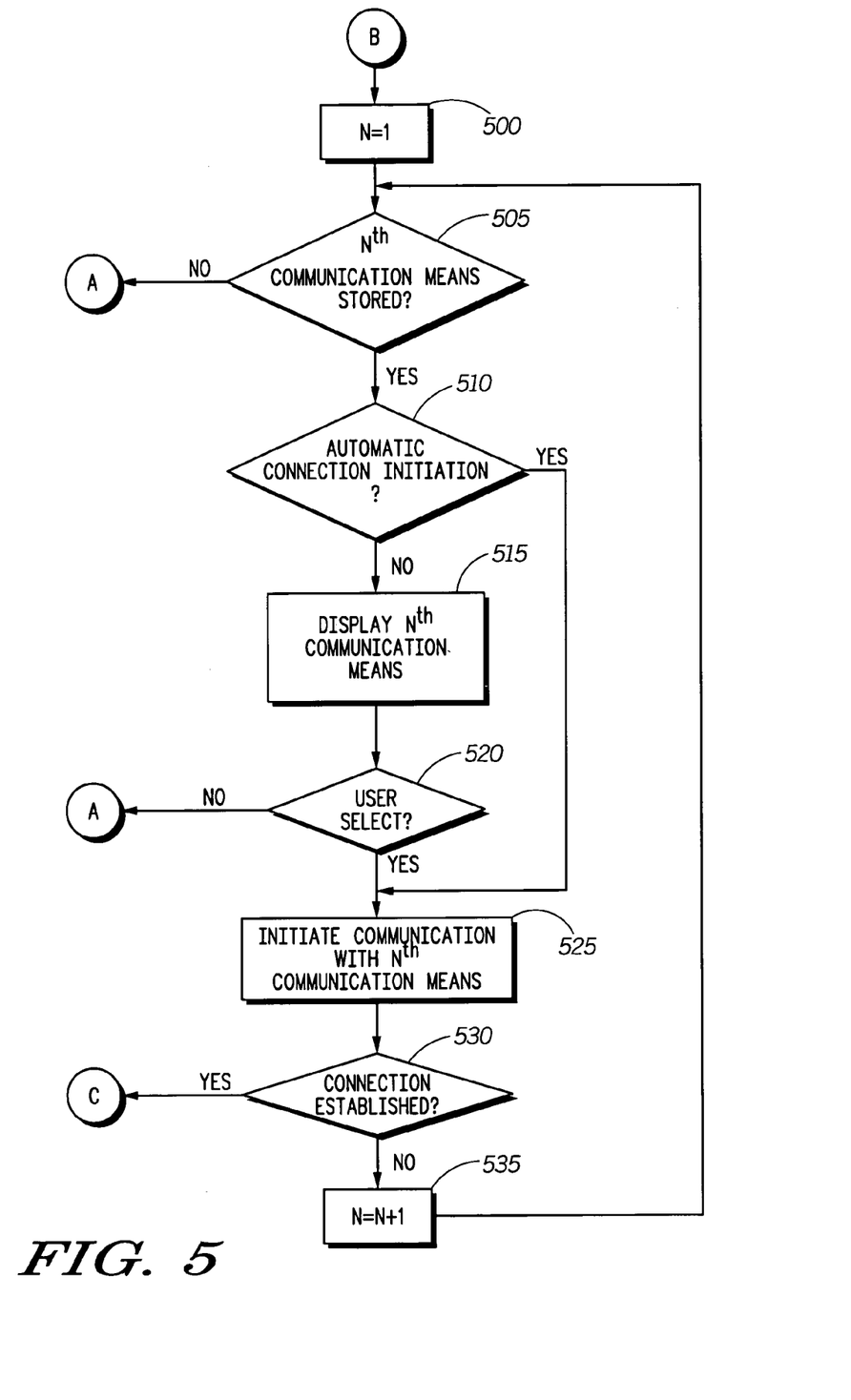

FIG. 5 illustrates one embodiment of the operation of the communication device 100. Specifically, FIG. 5 illustrates the operation of the communication device 100 in utilizing the fixed communication order 345. The process begins with node B. Next, in Step 500, a counter is set to N=1. Next, in Step 505, the process determines whether or not the Nth communication means is stored. For example, when N=1, the communications manager application 140 queries the contacts preferences directory 300 to determine if a first communication means 320 is identified with the contact having the communication means initiated in Step 410 of FIG. 4. When the contact does not have an associated Nth communication means, the process returns to node A of FIG. 4. When the contact does have an Nth communications means associated therewith, the process continues to Step 510 in which the process determines whether or not an automatic connection initiation option has been set. The automatic connection initiation option can be set by the device user via the user interface 135, can be preset when the communication device 100 is programmed during manufacturing, can be preset by the service provider of the communication device 100, can be set via a received signal, or the like. It will be appreciated by those of ordinary skill in the art that the automatic connection initiation option can be activated for all contacts within the contacts directory 200 or alternatively can be activated separately for individual contacts as desired. When the automatic connection initiation option has not been activated in Step 510, the process continues with Step 515 in which the Nth communication means is displayed on the display 130. Next, in Step 520, the process determines whether the device user selects to initiate a communication using the Nth communication means. When the device user does not select to initiate such a communication, the process returns to node A of FIG. 4. When the device user selects to initiate a communication using the Nth communication means in Step 520, or when automatic connection initiation has been activated in Step 510, the process continues with Step 525 in which the communication device 100 initiates a communication with the Nth communication means. Next, in Step 530, the process determines whether a connection has been established with the Nth communication means. When a connection has been established, the process continues with node C of FIG. 4 as described previously. When a connection is not established with the Nth communication means in Step 530, the process continues with Step 535 in which the counter is incremented to N=N+1. The process then cycles back to Step 505.

Figure 6:
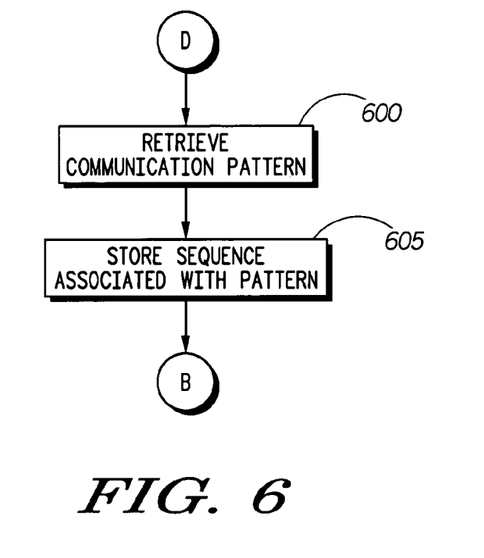

FIG. 6 illustrates one embodiment of the operation of the communication device 100. Specifically, FIG. 6 illustrates the operation of the communication device 100 in utilizing the pattern communication order 350. The process begins with node D. Next, in Step 600, the communication device 100 retrieves the communication pattern for the contact associated with the communication means attempted to be connected to in Step 410 of FIG. 4. For example, the communications manager application 140 can retrieve from the memory 120 a stored list of a predetermined quantity of historical information related to various means by which the contact has been communicated with in the past. Similarly, the communications manager application 140 can query via the processor 115 to the communication system upon which the communication device 100 is connected to be sent a similar historical perspective of communication patterns with the contact. Next, in Step 605, the communication means order 340 for the identified contact is updated within the contacts preferences directory 300 to match the historical communication pattern. The process then continues to node B of FIG. 5 as described previously herein.

Figure 7:
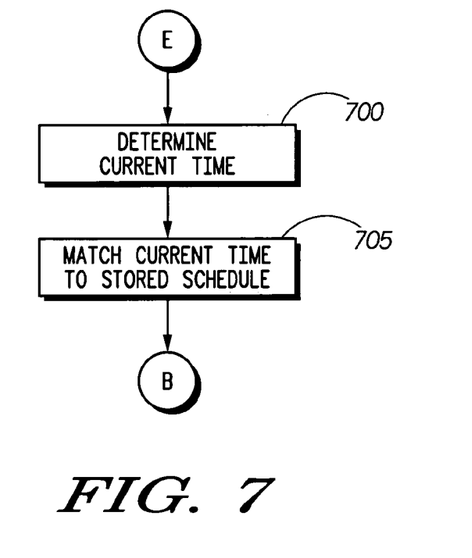

FIG. 7 illustrates one embodiment of the operation of the communication device 100. Specifically, FIG. 7 illustrates the operation of the communication device 100 in utilizing the time based communication order 355. The process begins with node E. Next, in Step 700, the current time 170 is determined. For example, the current time 170 can be retrieved from the time memory 165. Alternatively, the current time 170 can be determined by querying an external time supplier such as requesting the time via an Internet service or via a communication system. Next, in Step 705, the current time 170 is matched to the schedule 315 stored for the contact within the contacts preferences directory 300. The process then continues with node B of FIG. 5 as described previously herein.

Figure 8:
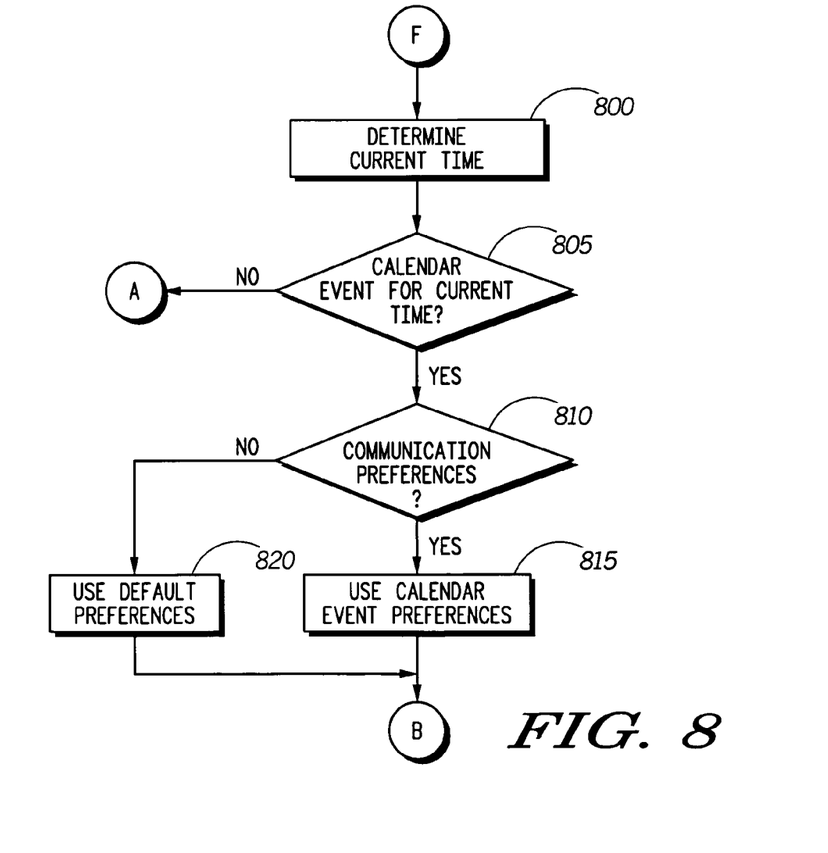

FIG. 8 illustrates one embodiment of the operation of the communication device 100. Specifically, FIG. 8 illustrates the operation of the communication device 100 in utilizing a calendar based communication order. The process begins with node F. Next, the process continues with Step 800 in which the current time 170 is determined. Next, in Step 805, the process determines whether a calendar event has been stored associated with the current time 170. The calendar event, for example, can be stored in the calendar memory 175 or can alternatively be retrieved from a calendar contained within a peripheral in communication with the communication device 100. When no calendar event is identified within the current time 170 in Step 805, the process continues to node A of FIG. 4. When a calendar event is identified in Step 805, the process continues with Step 810 in which the process determines whether a set of communication order preferences have been stored with the calendar event. For example, the device user can determine a unique communication order to be associated wit the particular timeframe of the calendar event and store that unique communication order along with the calendar event in accordance with the present invention. When no communication preferences have been identified with the calendar event, the process continues to Step 820 in which a default set of preferences is utilized. The default set of preferences, for example, can be the fixed communication order 345, the pattern communication order 350, the time based communication order 355, or the like for the contact. When communication preferences have been identified with the calendar event, the process continues to Step 815 and the unique communication order identified with the calendar event is utilized. The process then continues after both Step 815 and Step 820 with node B of FIG. 5.

Figure 9:
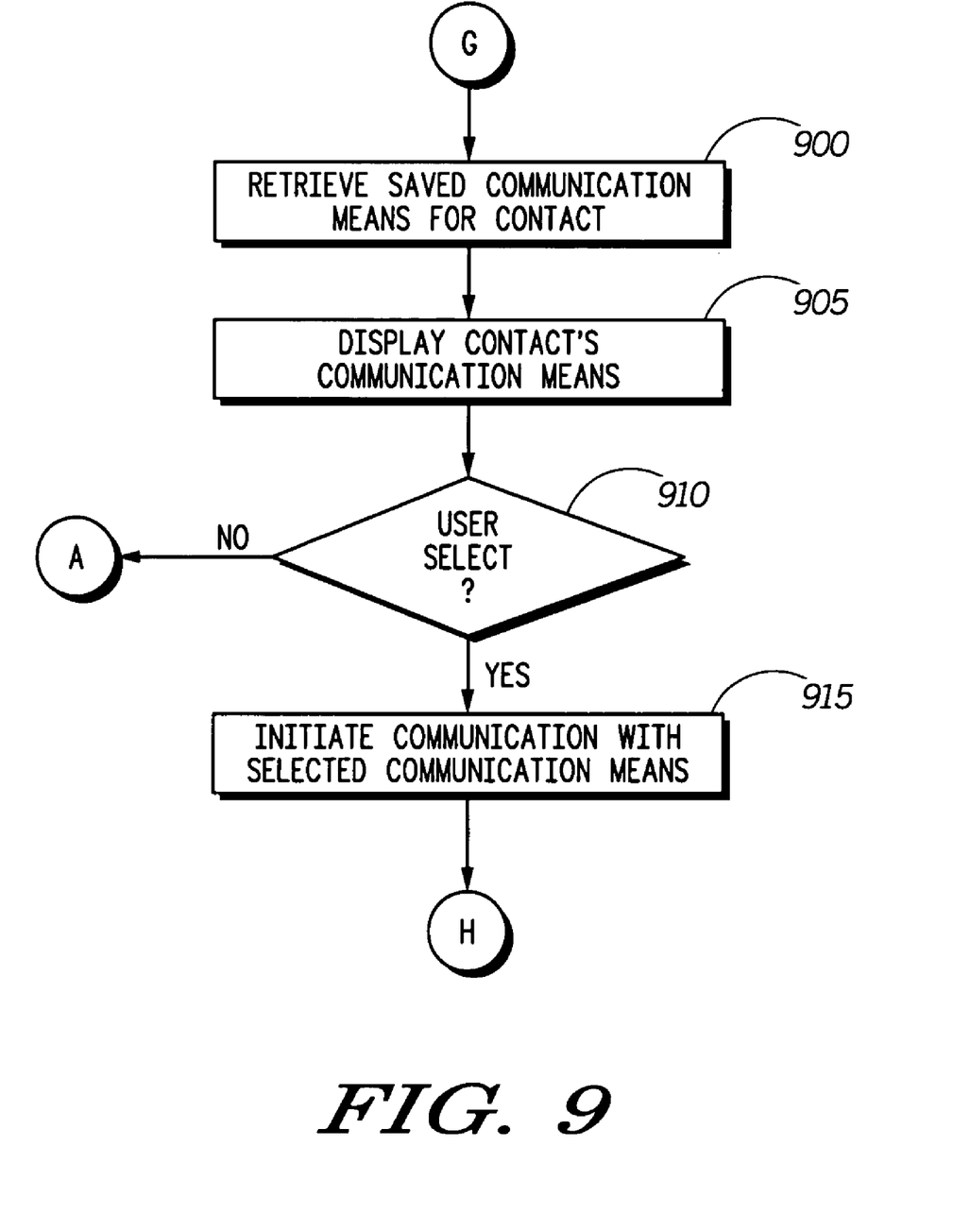

FIG. 9 illustrates one embodiment of the operation of the communication device 100. Specifically, FIG. 9 illustrates the operation of the communication device 100 when the device user is provided with the list of communication means available. The process begins with node G. Next the process continues with Step 900, in which all communication means stored for the contact identified with the communication means in which communication was initiated in Step 410 of FIG. 4. Next, in Step 905, all the stored communication means for the contact are displayed on the display 300. Next, in Step 910, the process determines whether the device user selects one of the displayed communication means. For example, the device user can use the user interface 135 to scroll through the list of communication means stored for the contact and choose one of the listed means. When the device user does not select a communication means in Step 910, the process returns to node A of FIG. 4. When the device user does select a communication means, the process continues with Step 915 in which the communication device 100 initiates communication with the selected communication means. The process then continues with node H of FIG. 4.

The invention as described herein provides a communication device with intelligent communications management including various options of facilitating the communication by a device user with one or more contacts having one or more contact mechanisms. If a call fails, the present invention provides a communication device that automatically provides supplemental telephone numbers or messaging addresses that are correlated to a contact directory entry, or are extracted from a set of 'communication connection patterns' that have been recorded by the device. The invention thus provides the user with a method to easily connect to a new number or send a new message.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for intelligent communication management within a communication device comprising the steps of:
   storing a communication preference identifying one or more communication means for sequentially initiating communication with the contact, wherein the communication preference comprises a communication preference chosen from a group consisting of a fixed communication order, a pattern communication order, a time based communication order, and a calendar based communication order;
   initiating communication with a contact using a first communication means via a first communication connection;
   detecting that the first communication connection is disconnected;
   identifying a second communication means associated with the contact, wherein the second communication means is identified by the communication preference;
   initiating communication with the contact via a second communication connection to the second communication means.

2. A method as recited in claim 1, wherein the detecting step comprises:
   determining that the first communication connection is not established.

3. A method as recited in claim 1 further comprising the steps of:
   retrieving a historical communication pattern for the contact;
   setting the communication preference for the contact using the historical communication pattern.

4. A method as recited in claim 1 further comprising the steps of:
   storing one or more communication preference orders each associated with a timeframe;
   determining a current time;
   matching the current time with one of the timeframes; and
   setting the communication preference to the communication preference order associated with the matched timeframe.

5. A method as recited in claim 1 further comprising the steps of:
   storing one or more calendar events each associated with a time frame, wherein each calendar event has an associated communication preference order;
   determining a current time;
   matching the current time with one of the timeframes; and
   setting the communication preference to the communication preference order of the calendar event associated with the matched timeframe.

6. A method as recited in claim 1 further comprising the steps of:
   storing one or more communication means for the contact;
   displaying the stored one or more communication means; and
   selecting the second communication means from the displayed one or more communication means prior to the initiating the second communication step.

7. A method as recited in claim 1 further comprising the steps of:
   displaying the second communication means; and
   selecting the second communication means prior to the initiating the second communication connection step.

8. A communication device having intelligent communication management, the communication device comprising:
   a transceiver for communicating with a contact using a first communication means via a first communication connection;
   a processor coupled to the transceiver for processing signals received from the transceiver and sending commands to the transceiver for communicating with one or more communication means including the first communication means and a second communication means;
   a memory coupled to the processor for storing one or more contacts each having one or more associated communication means, the memory storing the contact associated with the first communication means and the second communication means; and
   a communications manager application coupled to the processor and to the memory, wherein the communications manager application is adapted to:
      detect that the first communication connection with the contact is disconnected;
      identify the second communication means associated with the contact; and
      cause the processor to initiate a second communication connection to the second communication means.

9. A communication device having intelligent communication management as recited in claim 8 wherein the memory further stores one or more communication preferences identifying the sequential order of the communication means for initiating communication with the contact, wherein the second communication means is identified by the communication preference.

* * * * *